(12) United States Patent
Hachiya

(10) Patent No.: US 8,023,292 B2
(45) Date of Patent: Sep. 20, 2011

(54) SWITCHING CONTROL DEVICE

(75) Inventor: Yoshiaki Hachiya, Shiga (JP)

(73) Assignee: Panasonic Corporation, Osaka (JP)

( * ) Notice: Subject to any disclaimer, the term of this patent is extended or adjusted under 35 U.S.C. 154(b) by 77 days.

(21) Appl. No.: 12/115,581

(22) Filed: May 6, 2008

(65) Prior Publication Data

US 2008/0278981 A1  Nov. 13, 2008

(30) Foreign Application Priority Data

May 11, 2007  (JP) ................................ 2007-126289

(51) Int. Cl.
*H02M 3/335*  (2006.01)
*G05F 1/00*  (2006.01)
(52) U.S. Cl. ..................................... 363/21.18; 323/282
(58) Field of Classification Search .................... 363/74, 363/78–80, 21.01, 21.18, 21.1; 323/242, 323/246, 282, 284, 285, 288, 349, 351
See application file for complete search history.

(56) References Cited

U.S. PATENT DOCUMENTS

| 5,677,643 | A | * | 10/1997 | Tomita ............................ 327/78 |
| 6,294,903 | B1 | * | 9/2001 | Yamashita et al. ............ 323/282 |
| 6,545,882 | B2 | | 4/2003 | Yang ........................... 363/21.08 |
| 6,812,682 | B2 | * | 11/2004 | Hachiya ........................ 323/284 |
| 6,987,677 | B2 | * | 1/2006 | Konno ............................ 363/49 |
| 7,061,213 | B2 | * | 6/2006 | Yoshida ........................ 323/224 |
| 7,208,985 | B2 | | 4/2007 | Yamashita .................... 327/108 |
| 7,489,528 | B2 | * | 2/2009 | Tanaka et al. ............. 363/21.01 |
| 2003/0020437 | A1 | * | 1/2003 | Kanamori .................... 323/222 |
| 2004/0155639 | A1 | * | 8/2004 | Mobers ........................ 323/282 |
| 2005/0280402 | A1 | * | 12/2005 | Nitta et al. .................... 323/259 |
| 2006/0181256 | A1 | * | 8/2006 | Nagai ........................... 323/283 |

FOREIGN PATENT DOCUMENTS

| CN | 1405962 A | 3/2003 |
| JP | 2002252970 A | 9/2002 |
| JP | 2006288104 A | 10/2006 |

* cited by examiner

*Primary Examiner* — Adolf Berhane
*Assistant Examiner* — Emily Pham
(74) *Attorney, Agent, or Firm* — Steptoe & Johnson LLP

(57) ABSTRACT

The present invention reduces switching noise generated in a switching control device having a switching element such as a switching power supply in linear linkage with the state of a load of the output and without increasing the control circuit scale which is a factor of cost increase. The present invention adopts a configuration of a control circuit having an ON/OFF circuit that controls the switching element such that one or both of two specified values (upper limit and lower limit) that specify triangular waves of a triangular wave generation circuit that specifies a drive oscillating frequency of the switching element is/are changed in linear linkage with the output load state.

18 Claims, 19 Drawing Sheets

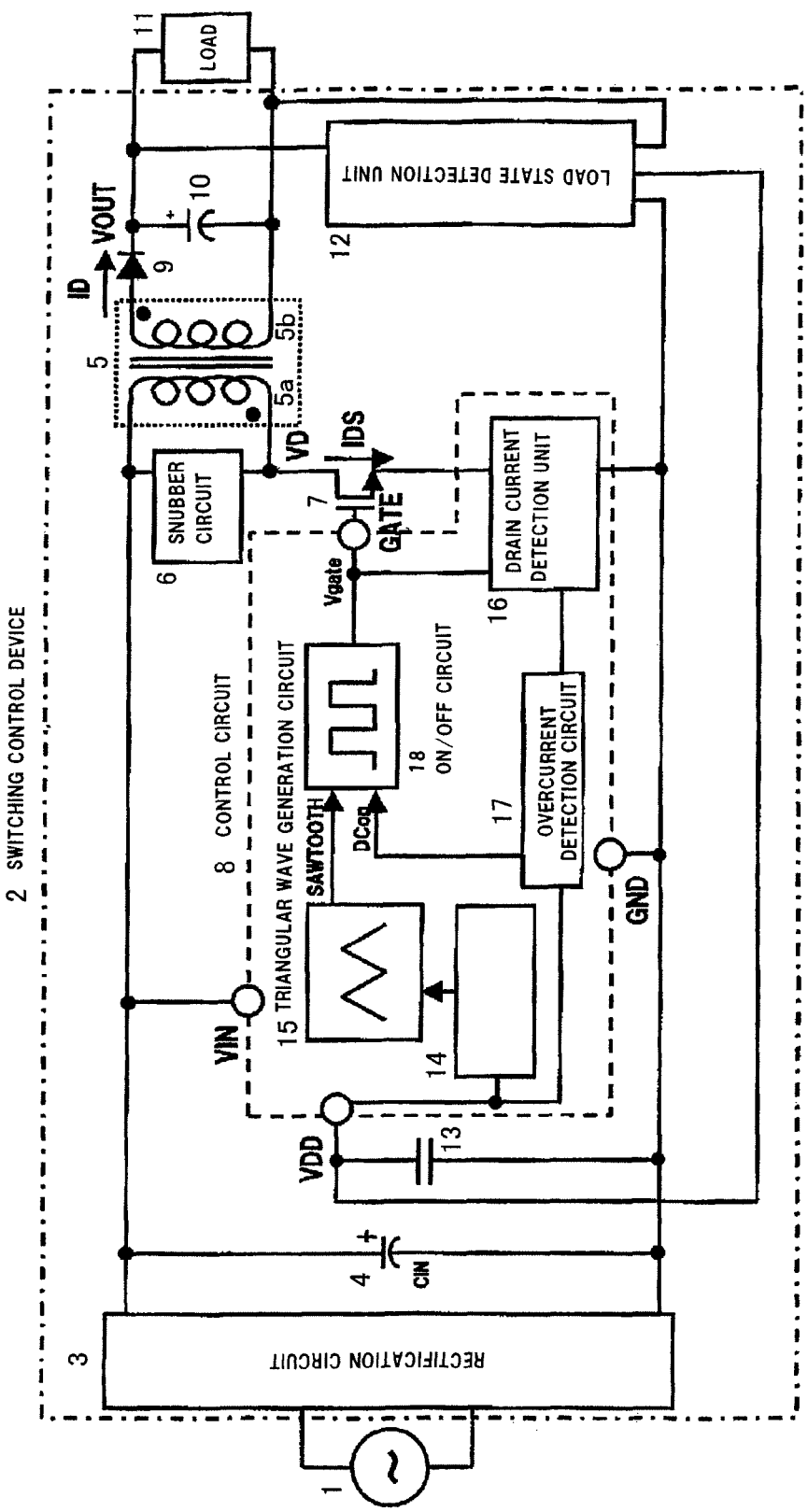

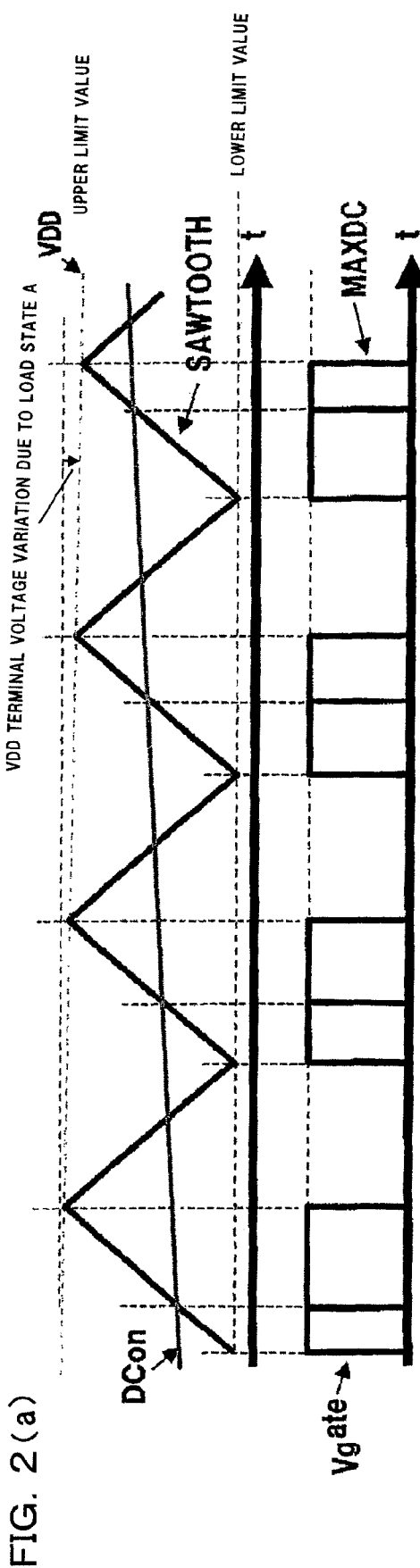
FIG. 2(a) (a) LOAD STATE A (WHEN VDD TERMINAL VOLTAGE DROPS)
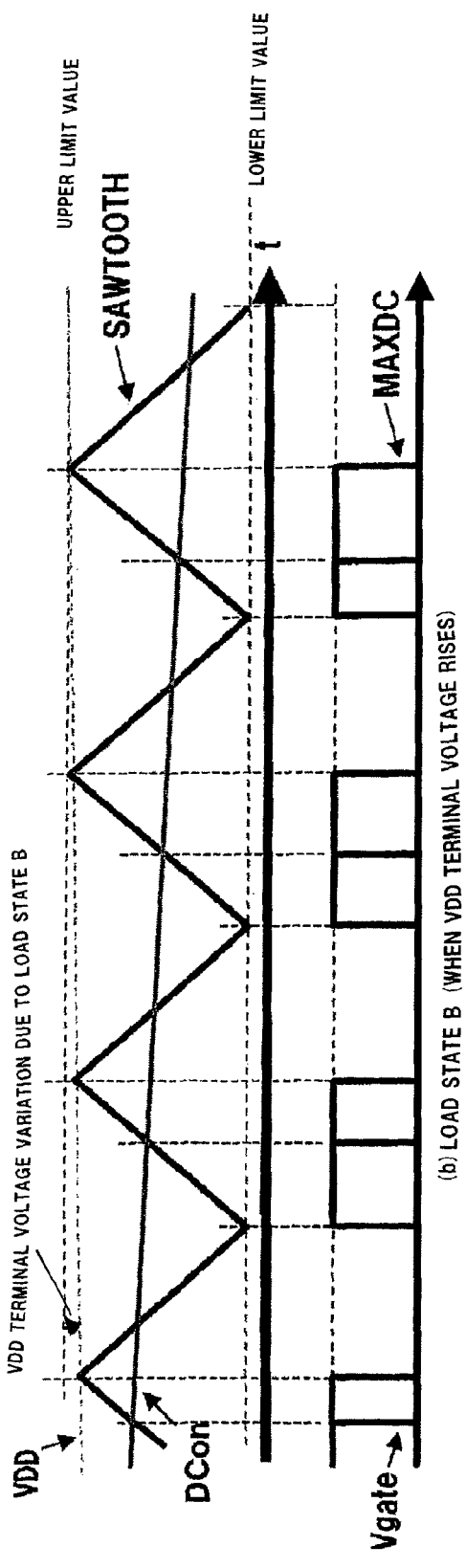
FIG. 2(b) (b) LOAD STATE B (WHEN VDD TERMINAL VOLTAGE RISES)

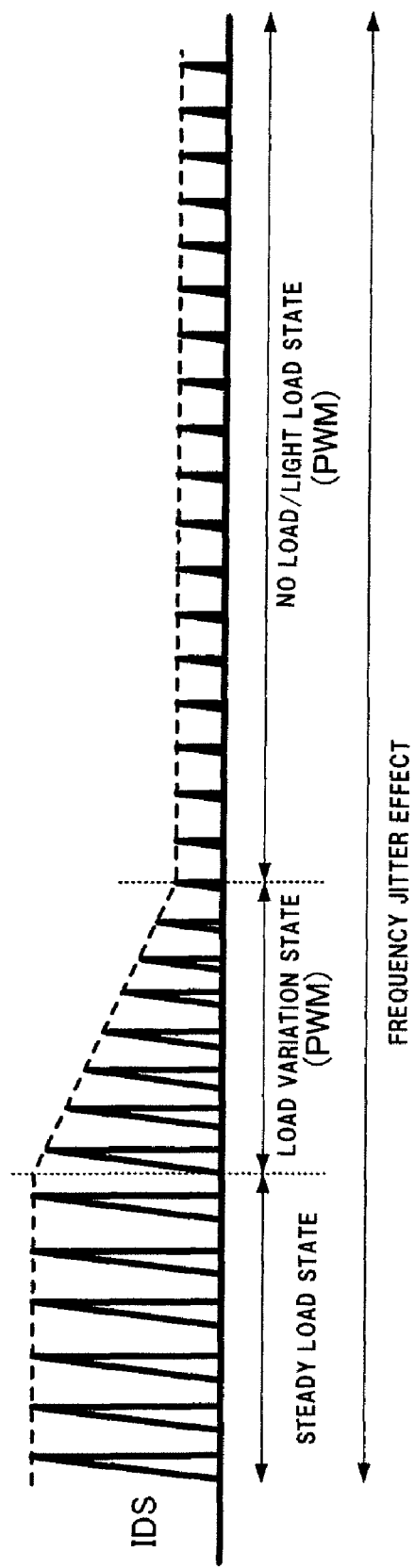

FIG. 5

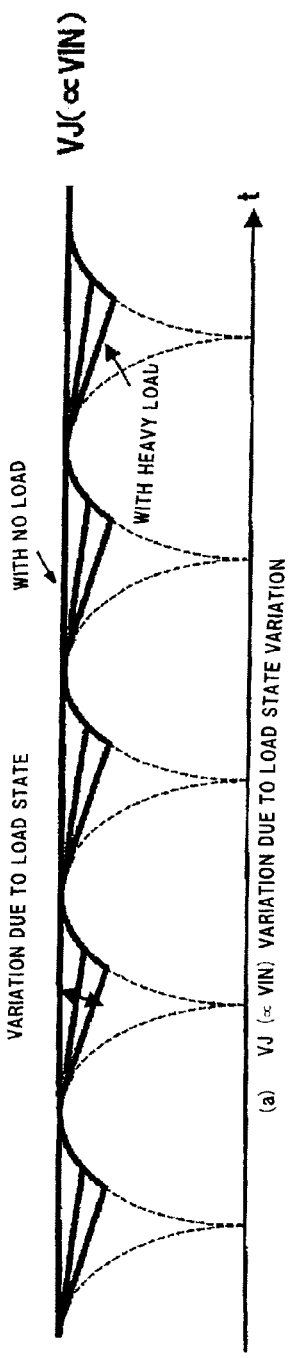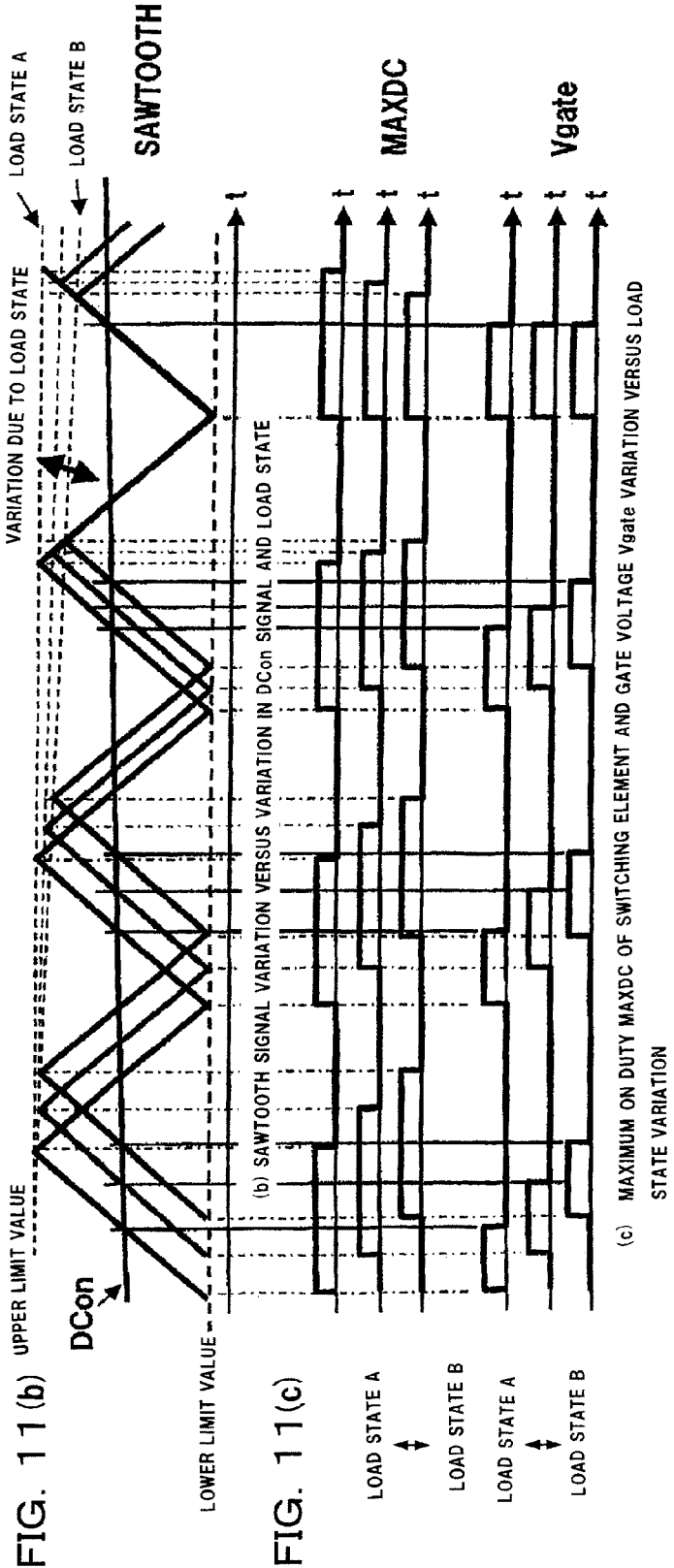
FIG. 11(a)
FIG. 11(b)
FIG. 11(c)

FIG. 19
PRIOR ART
(a) 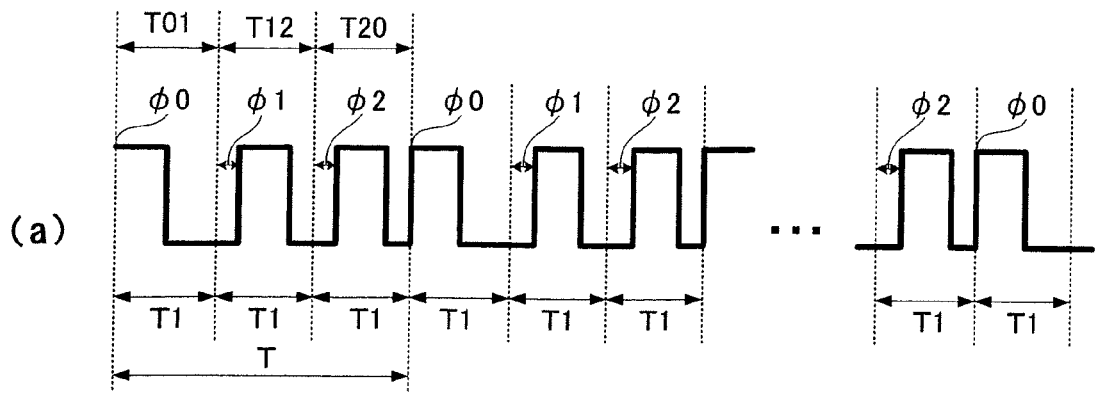
(b) 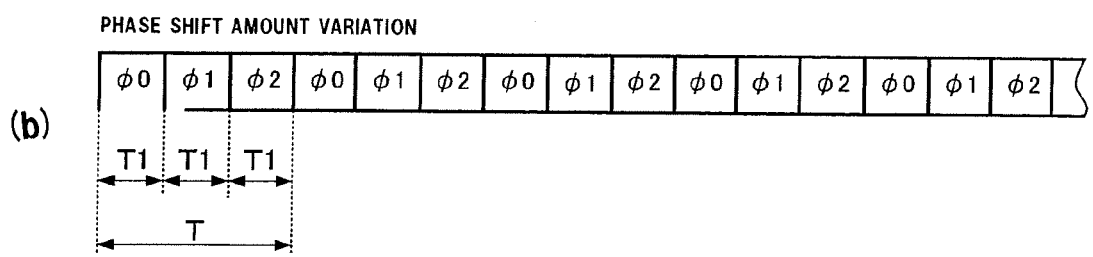
(c) 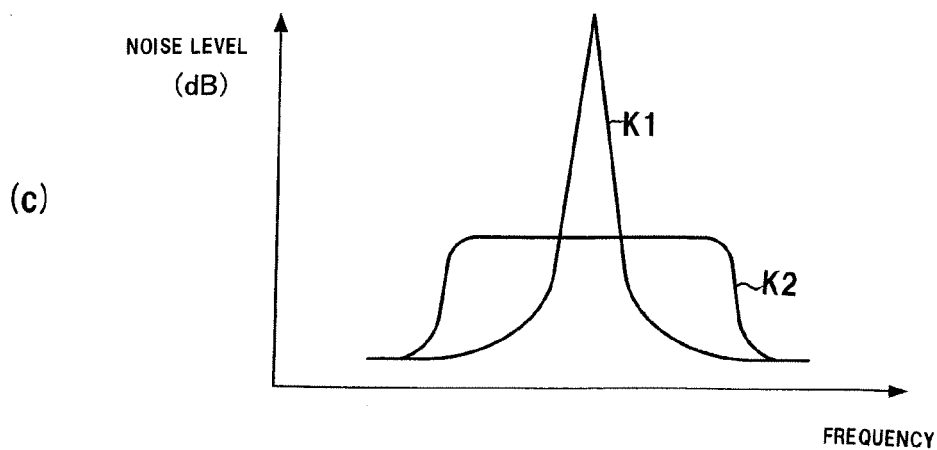

SWITCHING CONTROL DEVICE

FIELD OF THE INVENTION

The present invention is a technique for reducing or alleviating noise produced through a switching operation of a switching control device. The present invention relates more particularly to a switching power control technique.

BACKGROUND OF THE INVENTION

FIG. 18 shows a first conventional example (JP2002-252970A). An input 1 is switched by a switching element 7, and a voltage of square wave resulting from the switching is smoothed by a reactor L(26) and a capacitor Cf(10) and outputted. In the process of output, a voltage obtained by dividing an output 11 is compared with a sawtooth wave outputted from a sawtooth wave generator by a comparator and a switching signal according to this comparison result is applied to the switching element 7. When the comparison result is applied, a counter is operated in synchronization with a vertex of the sawtooth wave, a switch SW1 is opened/closed, a time constant of a time constant circuit made up of R0 and C is adjusted according to the presence/absence of a resistor R1, signals of frequency f1, f2 generated from the sawtooth wave generator are switched sequentially and given to the comparator. The noise level is reduced by distributing peaks of switching noise in the frequency domain, sequentially switching between the switching frequencies and thereby distributing noise energy.

Furthermore, FIG. 19 shows a second conventional example (JP2006-288104A). The rising edge of a drive pulse that drives a power switching element is repeatedly shifted by a basic pattern made up of three different shift amounts φ0 to φ2 for a period T1. In this way, the switching frequencies created by the rising edges of these drive pulses are distributed. Furthermore, a distribution frequency which is the reciprocal of the repetition period T of this basic pattern is set to an audible frequency or higher.

DISCLOSURE OF THE INVENTION

The conventional examples have the following problems.
(1) In terms of practical levels, since there is a limit to a plurality of preset frequencies, noise level peaks are dispersed by the number of preset frequencies and there is a limit to the reduction or alleviation of noise.
(2) The switching element drive frequency is irrelevant to the state of an output load and switching control needs to be made compatible with control of a power supply to the output, and therefore a high-level control technique is required.
(3) Since a plurality of frequencies need to be preset, the circuit scale increases (factor of cost increase).

A first switching control device of the present invention includes a load state detection unit for supplying inputted power to a load connected to an output and detecting states of a switching element and the load connected to the output and a control circuit for controlling ON/OFF of the switching element by the output of the load state detection unit, wherein the control circuit includes a triangular wave generation circuit and a triangular wave specified value generation circuit for generating two different specified values to form triangular waves according to the output of the load state detection unit.

Adopting such a configuration eliminates the necessity for a circuit for presetting a plurality of frequencies for the control circuit and causes the frequency of the switching element to change according to the state of the load connected to the output, and can thereby solve the aforementioned three problems.

A second switching control device of the present invention includes a load state detection unit for supplying inputted power to a load connected to an output and detecting states of a switching element and the load connected to the output and a control circuit for controlling ON/OFF of the switching element by the output of the load state detection unit, wherein the control circuit includes a light load detection circuit that suspends or stops ON/OFF control of the switching element when the load state of the output is no load or light load, a triangular wave generation circuit and a triangular wave specified value generation circuit that generates two different specified values for forming triangular waves according to the output of the load state detection unit.

Adopting such a configuration can solve the aforementioned three problems as in the case of the first switching control device of the present invention and realize energy saving in a no load or light load state as in the case where the switching control device is on standby.

A third switching control device of the present invention is the first or second switching control device of the present invention, wherein the load state detection unit is made up of an input voltage detection circuit.

Adopting such a configuration can simplify the configuration of the switching control device, thereby not only solve the aforementioned three problems but also reduce the size of the switching control device.

A fourth switching control device of the present invention is the third switching control device of the present invention, wherein the control circuit includes an overcurrent detection circuit that adjusts a current that flows into the switching element according to the output of the input voltage detection circuit.

Adopting such a configuration can further simplify the configuration of the switching control device, thereby not only solve the aforementioned three problems but also reduce the size of the switching control device.

In the first to fourth switching control devices of the present invention, the value that specifies an upper limit out of the two different specified values for forming triangular waves in the triangular wave specified value generation circuit is more preferably generated according to the output of the load state detection unit.

Adopting such a configuration can solve the aforementioned three problems.

In the first to fourth switching control devices of the present invention, the value that specifies a lower limit out of the two different specified values for forming triangular waves in the triangular wave specified value generation circuit is more preferably generated according to the output of the load state detection unit.

Adopting such a configuration can solve the aforementioned three problems.

The present invention can reduce noise generated at a switching control device having a switching element according to the load state of output without increasing the scale of the control circuit which can be a factor for a cost increase, and can thereby facilitate safe design of the switching control device.

BRIEF DESCRIPTION OF THE DRAWINGS

FIG. 1 is a circuit diagram showing a switching control device according to a first embodiment of the present invention;

FIG. 2 illustrates the operation of the switching element by the control circuit in the switching control device according to the first embodiment of the present invention;

FIG. 3 illustrates the operation of the switching element by the control circuit corresponding to the load state of the output of the switching control device according to the first embodiment of the present invention;

FIG. 5 is a circuit diagram showing a switching control device according to a third embodiment of the present invention;

FIG. 11 illustrates the operation of the switching element by the control circuit in the switching control device according to the sixth embodiment of the present invention;

FIG. 19 is a circuit diagram showing a switching control device according to a second conventional example.

DESCRIPTION OF THE EMBODIMENTS

Figure 4:
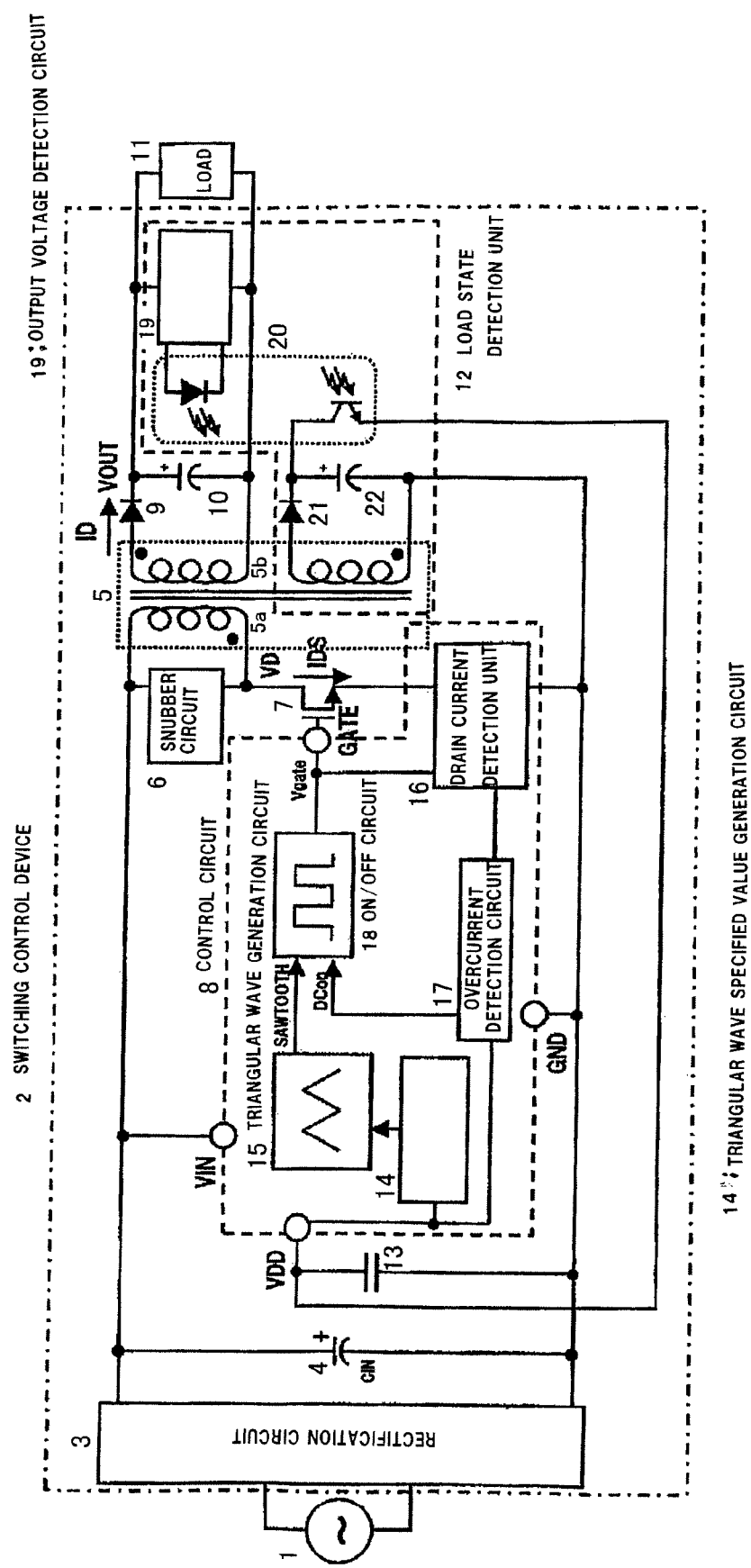
FIG. 4 is a circuit diagram showing a switching control device according to a second embodiment of the present invention.

Hereinafter, embodiments of the present invention will be explained.

Embodiment 1

FIG. 1 shows a circuit diagram showing a switching control device according to a first embodiment of the present invention, FIG. 2 illustrates the operation of the switching element by the control circuit in the switching control device in FIG. 1 and FIG. 3 illustrates the operation of the switching element by the control circuit corresponding to the load state of the output of the switching control device in FIG. 1.

As shown in FIG. 1, the switching control device 2 is constructed of a rectification circuit 3 for rectifying a power supply 1 connected to the input, a smoothing capacitor 4 for smoothing the output of the rectification circuit 3, a transformer 5 for transforming/supplying power from an input side (5a) to an output side (5b), a snubber circuit 6 for protecting a switching element 7 from ringing generated through ON/OFF control by a control circuit 8 of the switching element 7, a rectification diode for rectifying the output side 5b of the transformer 5, a smoothing capacitor 10 for smoothing the output of the rectification diode 9 and supplying power to a load 11 connected to the output, a load state detection unit 12 for feeding back the load state detection result of the load 11 to a supply voltage terminal (hereinafter referred to as "VDD terminal") of the control circuit 8 and a capacitor 13 connected to the VDD terminal of the control circuit 8 and a GND terminal. Power is supplied to the VDD terminal of the control circuit 8 from a VIN terminal at a startup. The output of the load state detection unit 12 also plays the role of a power supply to the VDD terminal of the control circuit 8. Here, the rectification circuit 3 is provided because the power supply 1 connected to the input is assumed to be an AC power supply, but when the power supply 1 is assumed to be a DC power supply, this rectification circuit 3 is not necessary. The control circuit 8 for controlling ON/OFF of the switching element 7 is constructed of a triangular wave specified value generation circuit 14 connected to the VDD terminal, a triangular wave generation circuit 15 wherein an upper limit value of triangular wave is changed by the output signal of the triangular wave specified value generation circuit 14, a drain current detection unit 16 for detecting a current that flows into the switching element 7, an overcurrent detection circuit 17 for adjusting a detection reference level of the drain current detection unit 16 by the voltage of the VDD terminal that varies depending on the output load state, and an ON/OFF circuit 18 that specifies an oscillating frequency by an output signal SAWTOOTH (triangular wave) of the triangular wave generation circuit 15 and specifies on duty by an output signal DCon of the overcurrent detection circuit 17 and performs ON/OFF control of the switching element 7.

FIG. 2(a) and FIG. 2(b) show a VDD terminal voltage variation versus the output signal SAWTOOTH of the triangular wave generation circuit 15, output signal DCon of the overcurrent detection circuit 17, and GATE terminal voltage signal Vgate of the switching element 7 when a setting is made such that the output of the load state detection unit 12 of the switching control device in FIG. 1 decreases when the load state of the output becomes a steady load state (that is, the power supply to the VDD terminal decreases) (FIG. 2(a)) or on the contrary the output of the load state detection unit 12 increases (that is, the VDD terminal voltage increases as the power supply to the VDD terminal increases) when the load state of the output becomes a no load or light load state (FIG. 2(b)). "MAXDC" in FIG. 2 indicates maximum on duty of the switching element 7.

In this case, due to a drop in the VDD terminal voltage, the oscillating frequency of the switching element 7 increases and on duty DCon of the switching element 7 increases, and on the contrary, due to an increase in the VDD terminal voltage, the oscillating frequency of the switching element 7 decreases and on duty DCon of the switching element 7 decreases. For this reason, as shown in FIG. 3, the oscillating frequency and on duty of the switching element 7 vary according to the load state variation of the output. This causes the oscillating frequency of the switching element 7 to be dispersed and can thereby reduce or alleviate noise generated by the switching operation.

Here, when the response speed of the output of the load state detection unit 12 versus the load state variation of the output is increased, the sensitivity of the VDD terminal voltage variation versus the load state variation of the output increases, and it is thereby possible to increase the sensitivity of the oscillating frequency of the switching element 7 and variation of on duty versus the load state of the output. On the contrary, when the response speed of the output of the load state detection unit 12 versus the load state variation of the output is decreased, the sensitivity of the VDD terminal voltage variation versus the load state variation of the output decreases, and it is thereby possible to also decrease the sensitivity of the oscillating frequency of the switching element 7 and variation of on duty versus the load state of the output. Therefore, by adjusting the response speed of the output of the load state detection unit 12 versus the load state variation of the output, it is possible to optimize the reduction or alleviation of noise produced due to the switching operation of the switching element 7.

Adopting a semiconductor device in which the switching element 7 and control circuit 8 are integrated into a single package can reduce the size of the switching control device and achieve high reliability. The same is applicable to all embodiments which will be described later.

Embodiment 2

FIG. 4 shows a switching control device according to a second embodiment of the present invention and more specifically shows the load state detection unit 12 of the switching control device according to the first embodiment of the present invention shown in FIG. 1 and since the effects obtained are the same, detailed explanations thereof will be omitted.

The load state detection unit 12 is constructed of an output voltage detection circuit 19, a photocoupler 20, an auxiliary winding 5c of a transformer 5, and a rectification diode 21 and a smoothing capacitor 22 connected to the auxiliary winding 5c. The output voltage detection circuit 19 detects an output voltage VOUT and the photocoupler 20 supplies power from the smoothing capacitor 22 to the VDD terminal of the control circuit 8 at a desired voltage or higher and the VDD terminal voltage increases. On the contrary, the VDD terminal voltage decreases at the desired voltage or below. In this way, the operation of the switching control device according to the first embodiment of the present invention can be realized.

Embodiment 3

Figure 5:
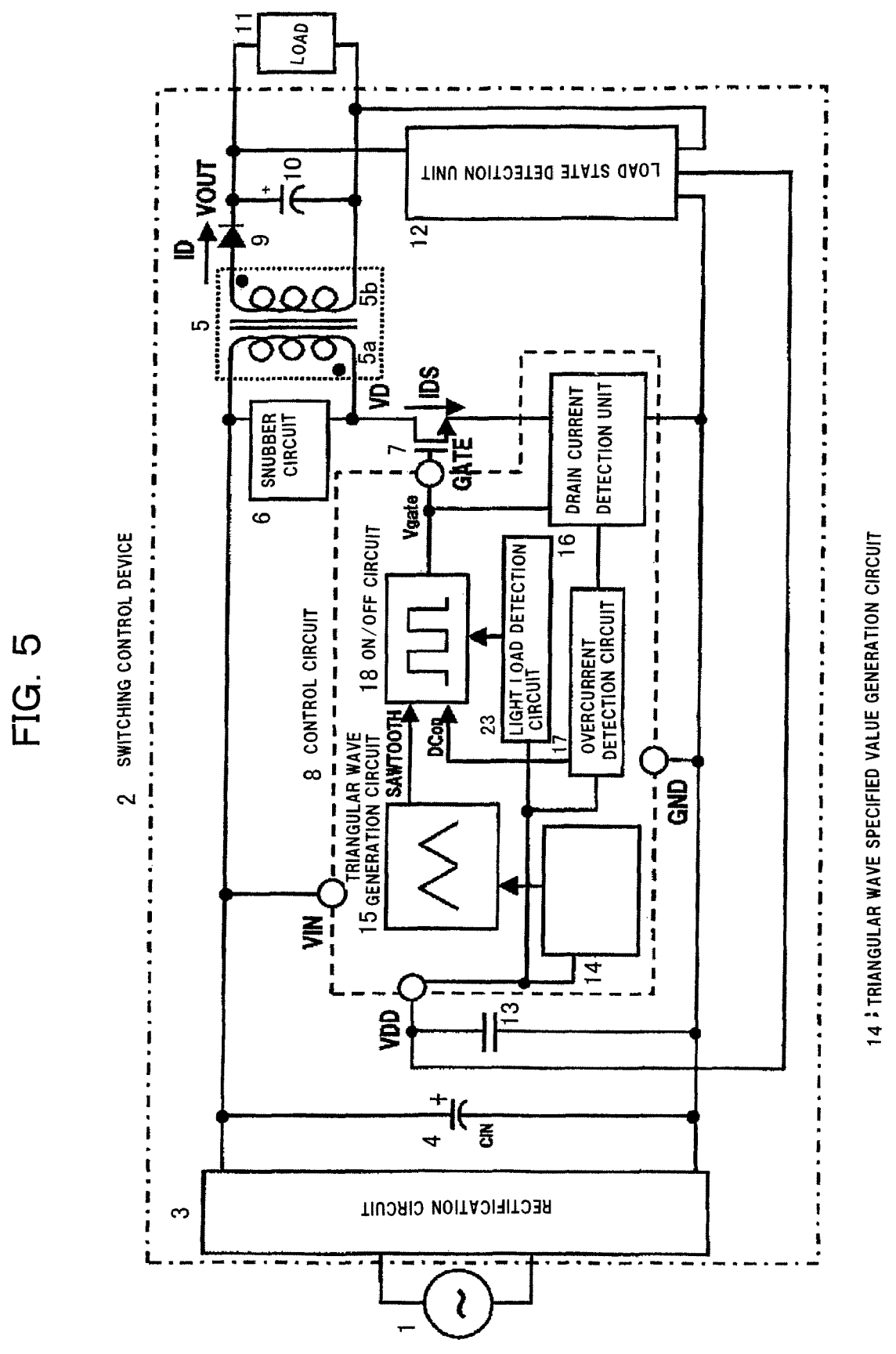
Figure 6:
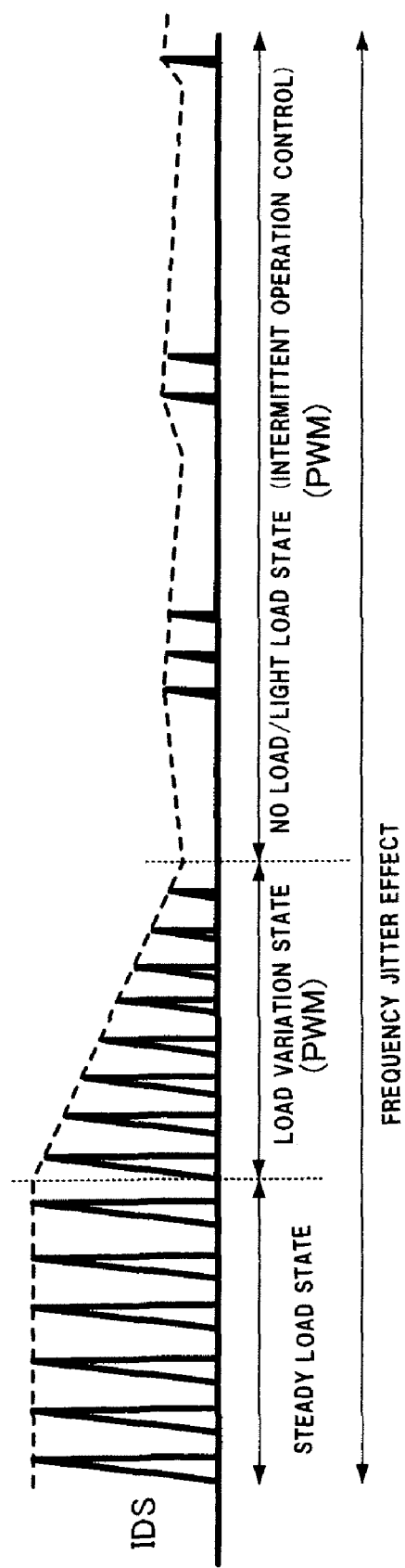
FIG. 6 illustrates the operation of the switching element by the control circuit corresponding to the load state of the output of the switching control device according to the third embodiment of the present invention.

FIG. 5 shows a switching control device according to a third embodiment of the present invention and FIG. 6 illustrates the operation of the switching element by the control circuit with respect to the load state of the output in the switching control device in FIG. 5. This embodiment is the same as the switching control device according to the first embodiment of the present invention except that the control circuit 8 is connected to the VDD terminal and a light load detection circuit 23 is provided which suspends or stops ON/OFF control over the switching element 7 by the ON/OFF circuit 18 in the case of no load or light load, and therefore only the effects of the light load detection circuit 23 will be explained below.

When the VDD terminal voltage which reflects the load state of the output reaches or exceeds an internally defined voltage, the light load detection circuit 23 detects that the output load is in a no load state or light load state and suspends or stops ON/OFF control over the switching element 7 by the ON/OFF circuit 18.

This can reduce power consumption in the case of no load or light load.

Here, providing the voltage defined in the light load detection circuit 23 with a hysteresis characteristic can stably control suspension or stoppage of ON/OFF control over the switching element.

Embodiment 4

Figure 7:
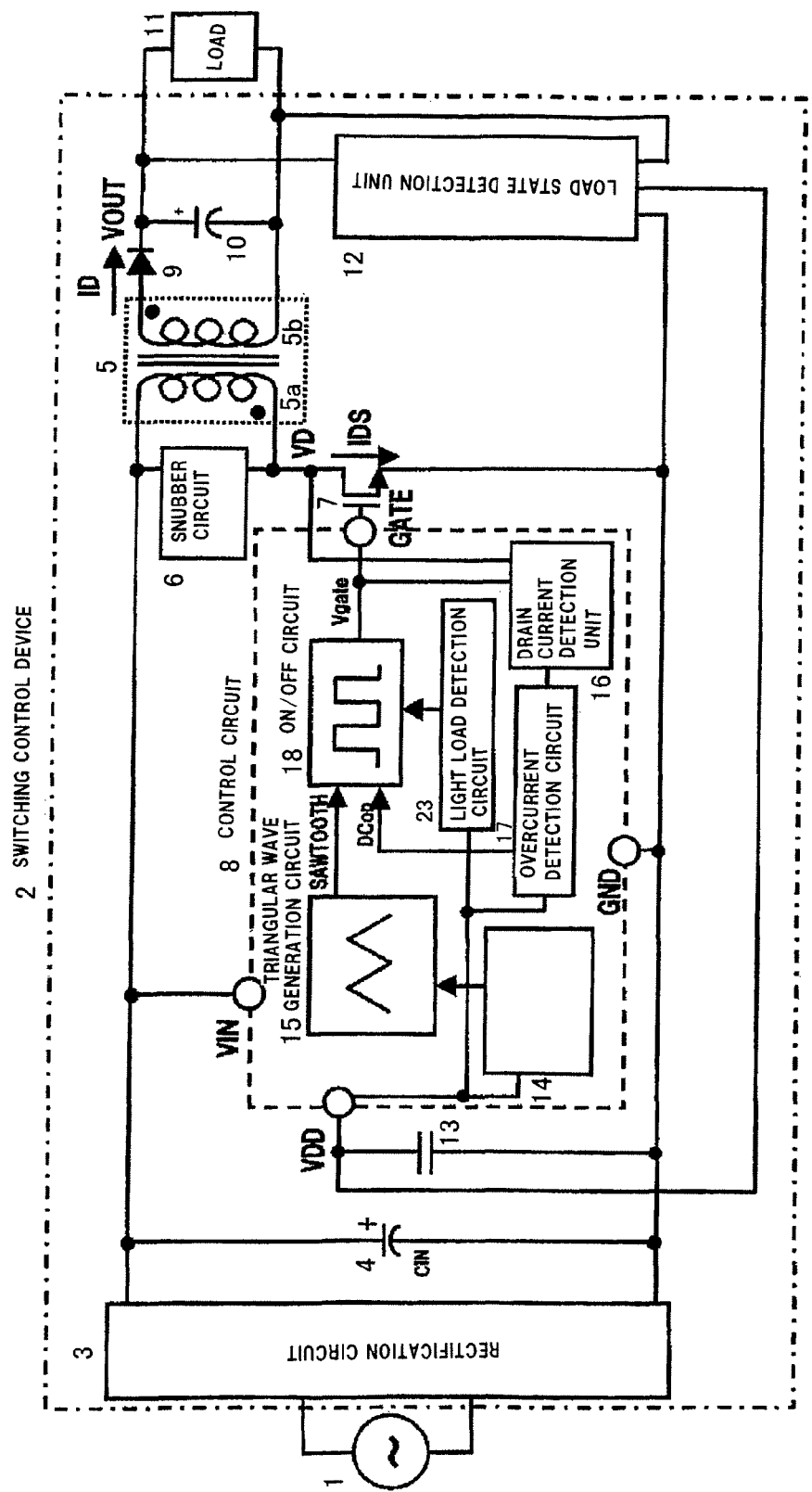
FIG. 7 is a circuit diagram showing a switching control device according to a fourth embodiment of the present invention.

FIG. 7 shows a switching control device according to a fourth embodiment of the present invention, which is designed to detect the drain current detection unit 16 of the switching control device according to the third embodiment of the present invention shown in FIG. 5 through an ON voltage of the switching element 7, and since the same effects are obtained, explanations thereof will be omitted.

Embodiment 5

Figure 8:
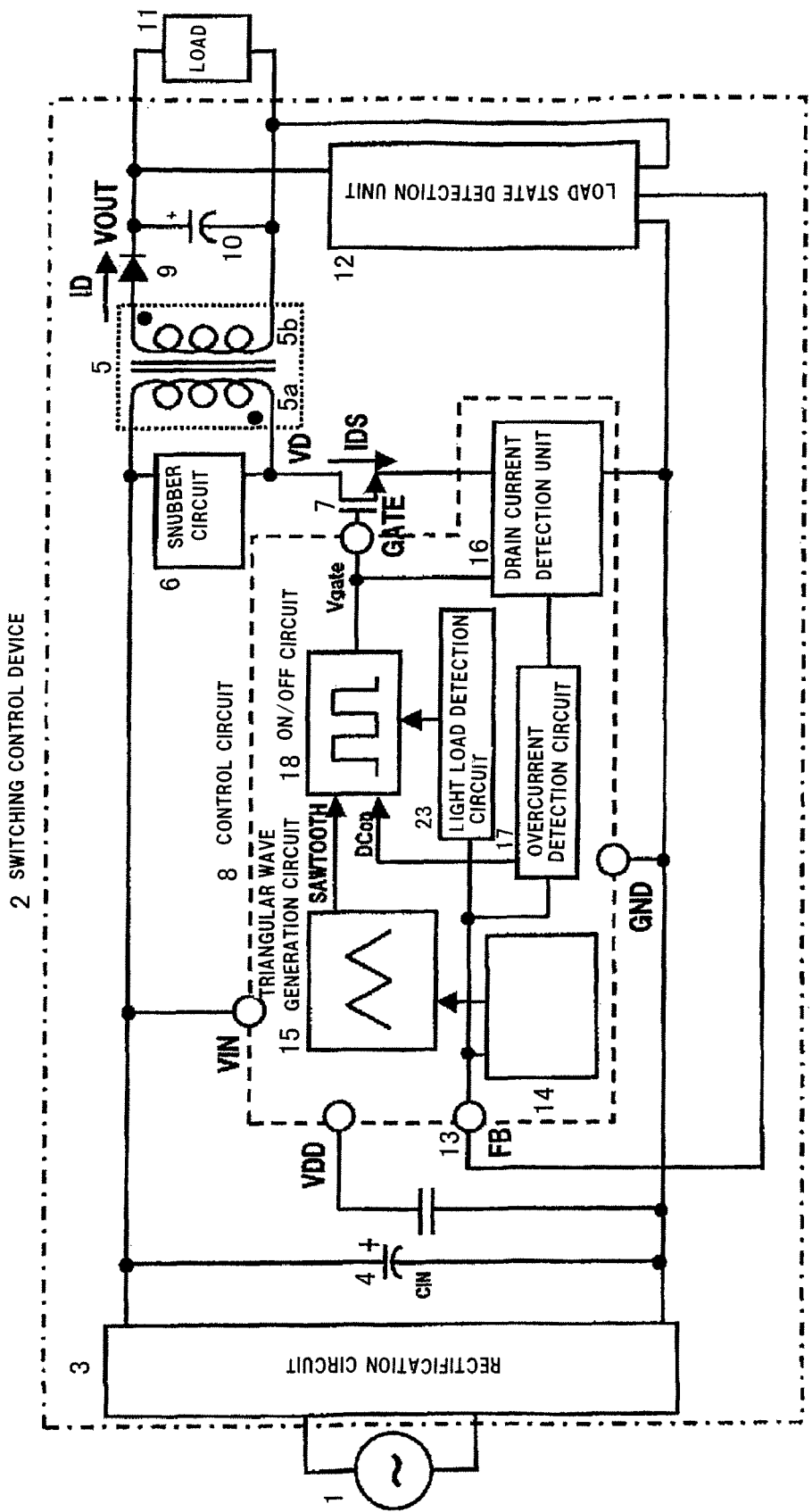
FIG. 8 is a circuit diagram showing a switching control device according to a fifth embodiment of the present invention.
Figure 9:
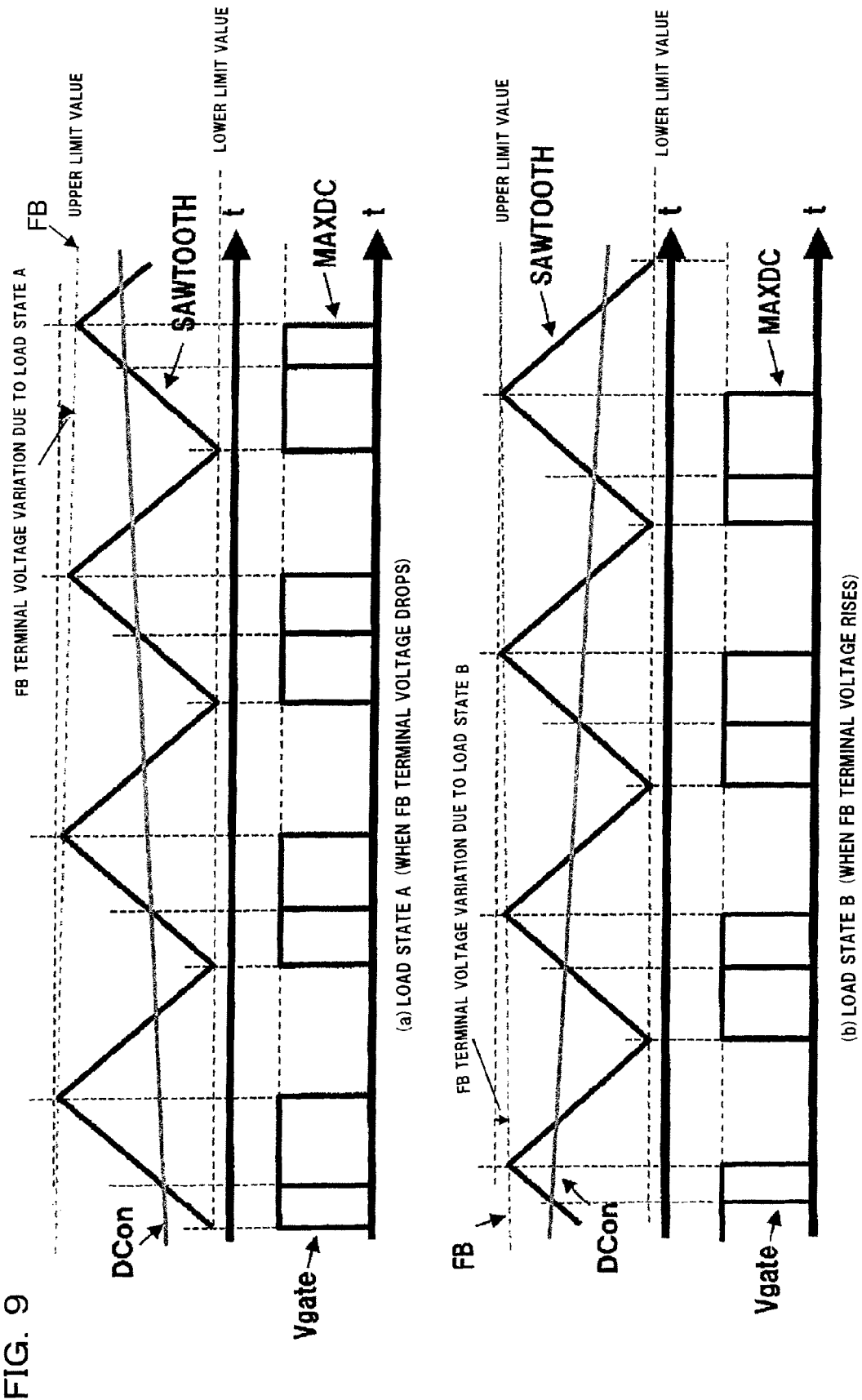
FIG. 9 illustrates the operation of the switching element by the control circuit in the switching control device according to the fifth embodiment of the present invention.

FIG. 8 shows a switching control device according to a fifth embodiment of the present invention and FIG. 9 illustrates the operation of the switching element by the control circuit in the switching control device in FIG. 8. This switching control device is provided with an FB terminal for inputting the output of the load state detection unit 12 in addition to the VDD terminal of the control circuit 8. Here, the circuit connected to the VDD terminal of the control circuit 8 in the switching control device according to the third embodiment of the present invention shown in FIG. 5 is connected to the FB terminal in the switching control device according to the fifth embodiment of the present invention in FIG. 8. The VDD terminal is supplied with power from the VIN terminal and is always controlled to a constant level as the supply voltage terminal of the control circuit 8. Therefore, switching control over the output signal of the load state detection unit 12 and the effects (noise reduction or alleviation effect and power consumption reduction effect in the case of no load or light load) are the same as those of the switching control device according to the third embodiment of the present invention shown in FIG. 5.

In this case, due to a drop of the FB terminal voltage, the oscillating frequency of the switching element 7 increases and on duty DCon of the switching element 7 increases. On the contrary, due to an increase of the FB terminal voltage, the oscillating frequency of the switching element 7 decreases and on duty DCon of the switching element 7 decreases. Therefore, as shown in FIG. 3, the oscillating frequency and on duty of the switching element 7 vary according to the load state variation of the output. This causes the oscillating frequency of the switching element 7 to be dispersed and can thereby reduce or alleviate noise generated due to the switching operation.

Embodiment 6

Figure 10:
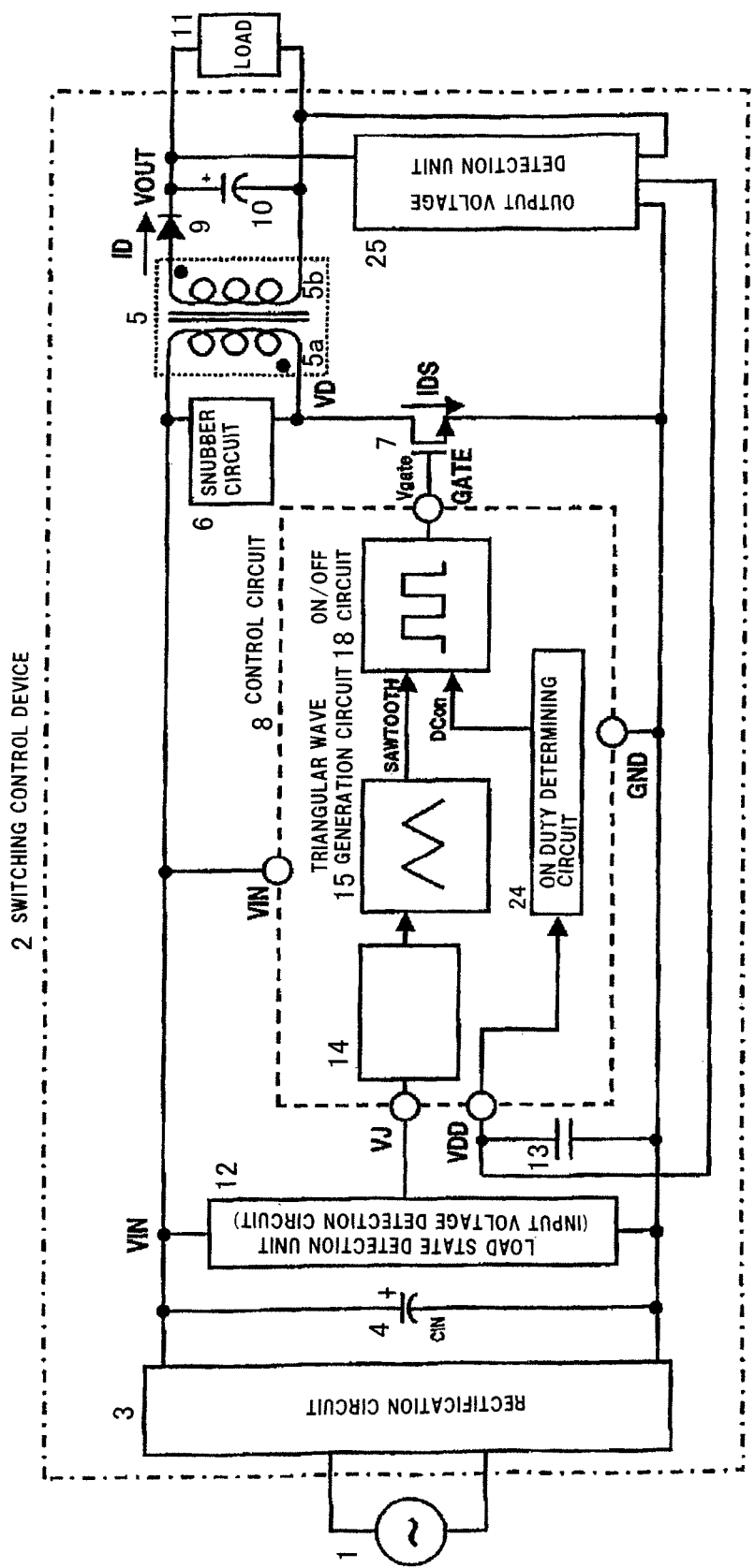
FIG. 10 is a circuit diagram showing a switching control device according to a sixth embodiment of the present invention.

FIG. 10 shows a switching control device according to a sixth embodiment of the present invention and FIG. 11 illustrates the operation of the switching element by the control circuit in the switching control device in FIG. 10.

As shown in FIG. 10, the switching control device 2 is constructed of a rectification circuit 3 for rectifying a power supply 1 connected to the input, a smoothing capacitor 4 for smoothing the output of the rectification circuit 3, a transformer 5 for transforming/supplying power from an input side (5a) to an output side (5b), a snubber circuit 6 for protecting a switching element 7 from ringing generated through ON/OFF control by a control circuit 8 of the switching element 7, a rectification diode 9 for rectifying the output side 5b of the transformer 5, a smoothing capacitor 10 for smoothing the output of the rectification diode 9 and supplying power to a load 11 connected to the output, an input voltage detection circuit 12 for detecting a voltage waveform (see FIG. 11(a)) of the smoothing capacitor 4 that varies depending on the load state of the output as the load state detection unit 12 and transmitting the signal to a VJ terminal of the control circuit 8, an output voltage detection unit 25 that detects the output voltage of the load 11 and feeds back the output voltage to a supply voltage terminal (hereinafter referred to as "VDD terminal") of the control circuit 8 and a capacitor 13 connected to the VDD terminal of the control circuit 8 and a GND terminal. Power is supplied to the VDD terminal of the control circuit 8 from a VIN terminal at a startup. The output of the output voltage detection unit 25 also plays the role of a power supply to the VDD terminal of the control circuit 8. Here, the rectification circuit 3 is provided because the power supply 1 connected to the input is assumed to be an AC power supply, but when the power supply 1 is assumed to be a DC power supply, this rectification circuit 3 is not necessary. The control circuit 8 for controlling ON/OFF of the switching element 7 is constructed of a triangular wave specified value generation circuit 14 connected to the VJ terminal, a triangular wave generation circuit 15 wherein an upper limit value of a triangular wave is changed by the output signal of the triangular wave specified value generation circuit 14, an on duty determining circuit 24 that outputs an on duty adjusting signal DCon of the switching element 7 by the voltage of the VDD terminal that varies depending on the load state and an ON/OFF circuit 18 that specifies an oscillating frequency based on an output signal SAWTOOTH of the triangular wave generation circuit 15 and specifies on duty based on an output signal DCon of the on duty determining circuit 24 and performs ON/OFF control of the switching element 7.

FIG. 11(a) shows a voltage waveform of the VJ terminal which is proportional to the input voltage VIN when the load state of the output changes from no load to heavy load. FIG. 11(b) shows a variation of SAWTOOTH which is the output signal of the triangular wave generation circuit 15 with respect to a load state variation of the output when the output signal DCon of the on duty determining circuit 24 changes as shown in FIG. 11(b) when the triangular wave specified value generation circuit 14 sets the VJ terminal voltage that varies depending on the load state variation of this output as an upper limit value of the triangular wave. FIG. 11(c) shows a maximum on duty signal MAXDC of the switching element 7 and a GATE terminal voltage signal Vgate of the switching element 7 generated by the SAWTOOTH signal and DCon signal shown in FIG. 11(b).

In this case, due to a drop in the VJ terminal voltage, the oscillating frequency of the switching element 7 increases and on duty DCon of the switching element 7 increases. On the contrary, due to an increase in the VJ terminal voltage, the oscillating frequency of the switching element 7 decreases and on duty DCon of the switching element 7 decreases. For this reason, as in the case of the operation of the switching control device according to the first embodiment of the present invention in FIG. 3, the oscillating frequency of the switching element 7 and on duty vary according to the load state variation of the output. This can reduce or alleviate noise generated by the switching operation of the switching element 7.

Embodiment 7

Figure 12:
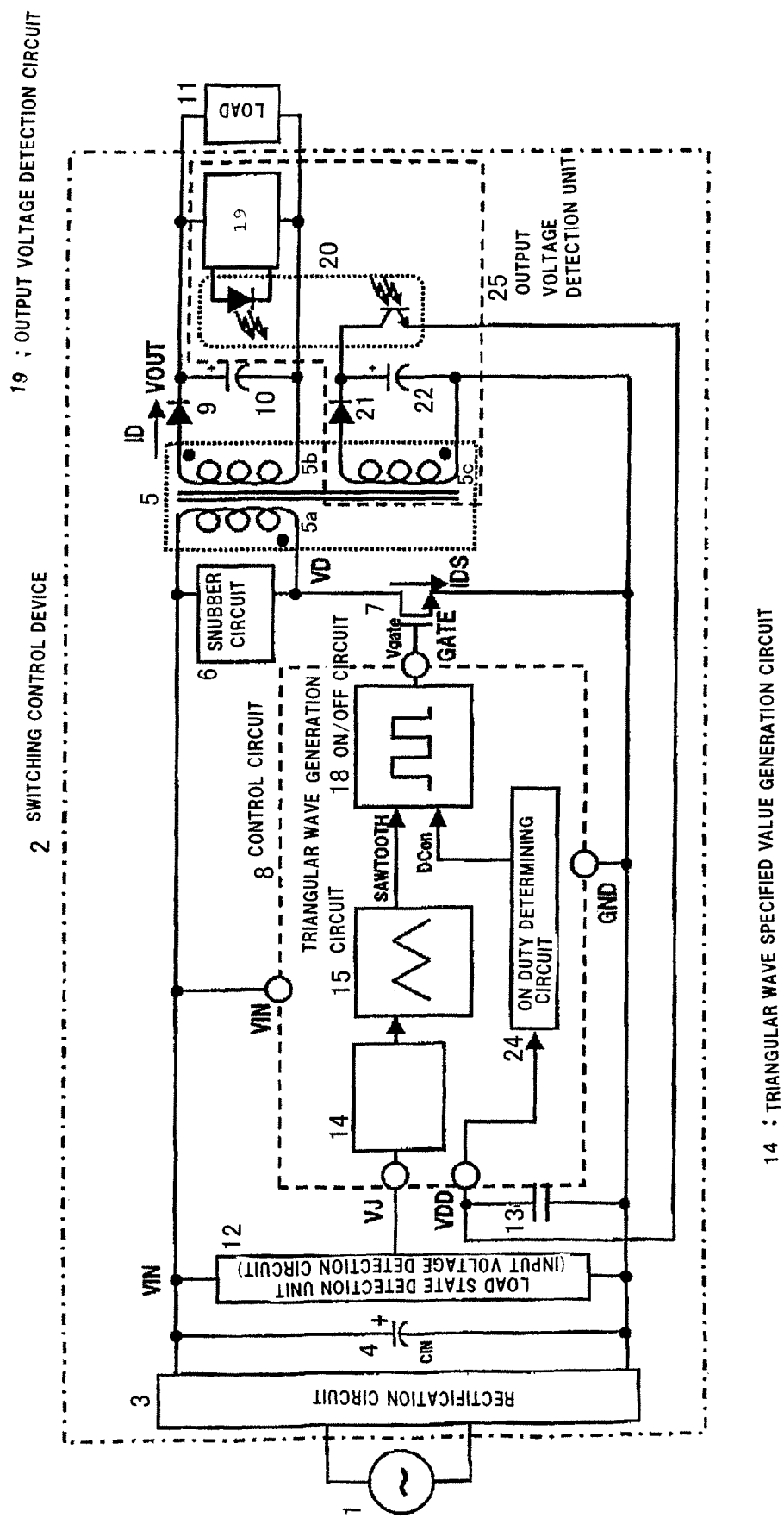
FIG. 12 is a circuit diagram showing a switching control device according to a seventh embodiment of the present invention.

FIG. 12 shows a switching control device according to a seventh embodiment of the present invention and more specifically shows the output voltage detection unit 25 of the switching control device according to the sixth embodiment of the present invention shown in FIG. 10 and since the effects obtained are the same, detailed explanations thereof will be omitted.

The output voltage detection unit 25 is constructed of an output voltage detection circuit 19, a photocoupler 20, an auxiliary winding 5c of the transformer 5 and a rectification diode 21 and a smoothing capacitor 22 connected to the auxiliary winding 5c. The output voltage detection circuit 19 detects an output voltage VOUT and the photocoupler 20 supplies power from the smoothing capacitor 22 to the VDD terminal of the control circuit 8 at a desired voltage or higher and the VDD terminal voltage increases. On the contrary, the VDD terminal voltage decreases at the desired voltage or below. In this way, the operation of the switching control device according to the sixth embodiment of the present invention can be realized.

Embodiment 8

Figure 13:
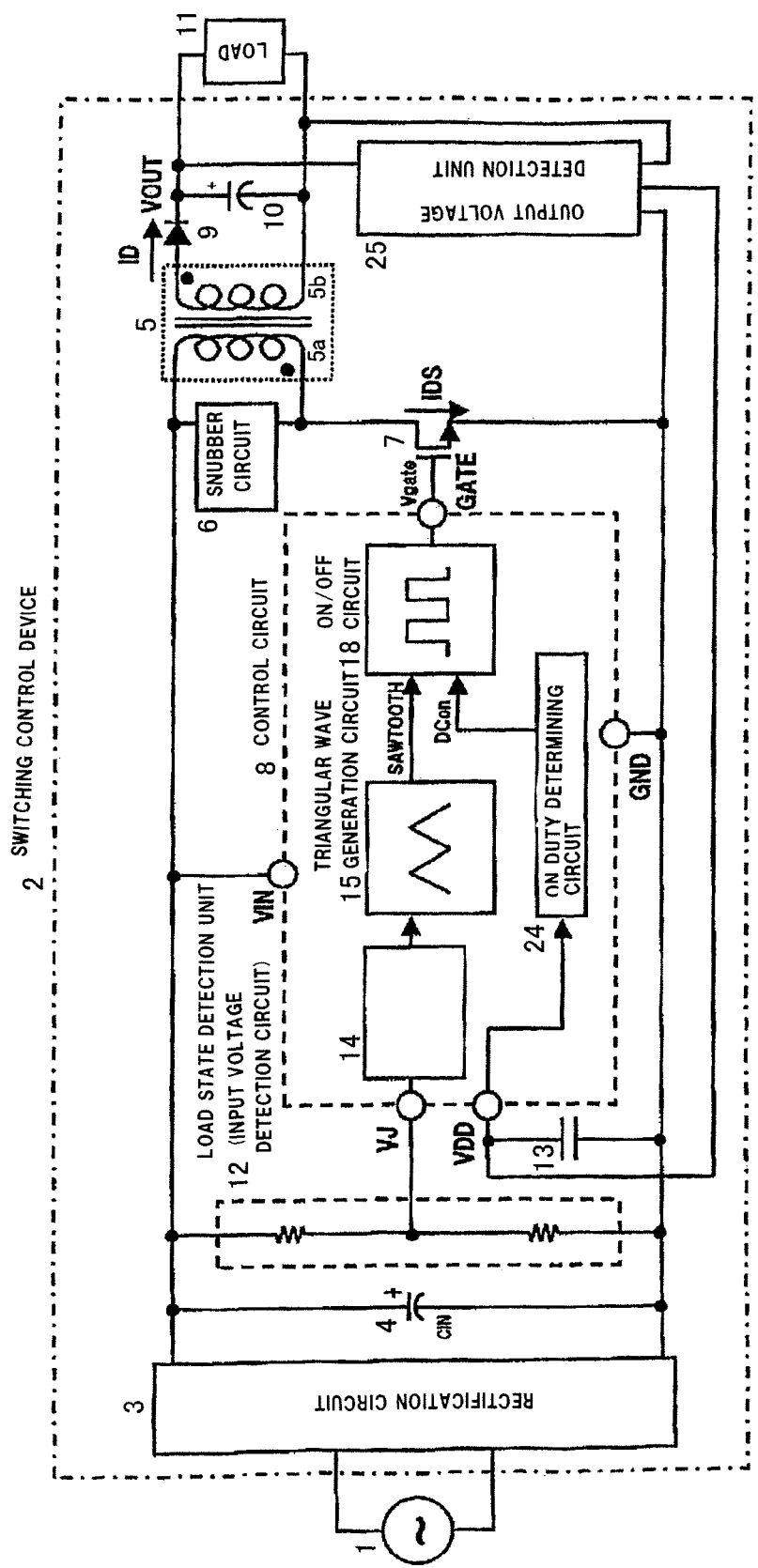
FIG. 13 is a circuit diagram showing a switching control device according to an eighth embodiment of the present invention.

FIG. 13 shows a switching control device according to an eighth embodiment of the present invention and more specifically shows the input voltage detection circuit which is the load state detection unit 12 of the switching control device according to the sixth embodiment of the present invention shown in FIG. 10 and since the effects obtained are the same, detailed explanations thereof will be omitted.

The input voltage detection circuit which is the load state detection unit 12 divides the input voltage VIN using two resistors and thereby outputs the divided voltage to the VJ terminal of the control circuit 8. In this way, the operation of the switching control device according to the sixth embodiment of the present invention can be realized.

Embodiment 9

Figure 14:
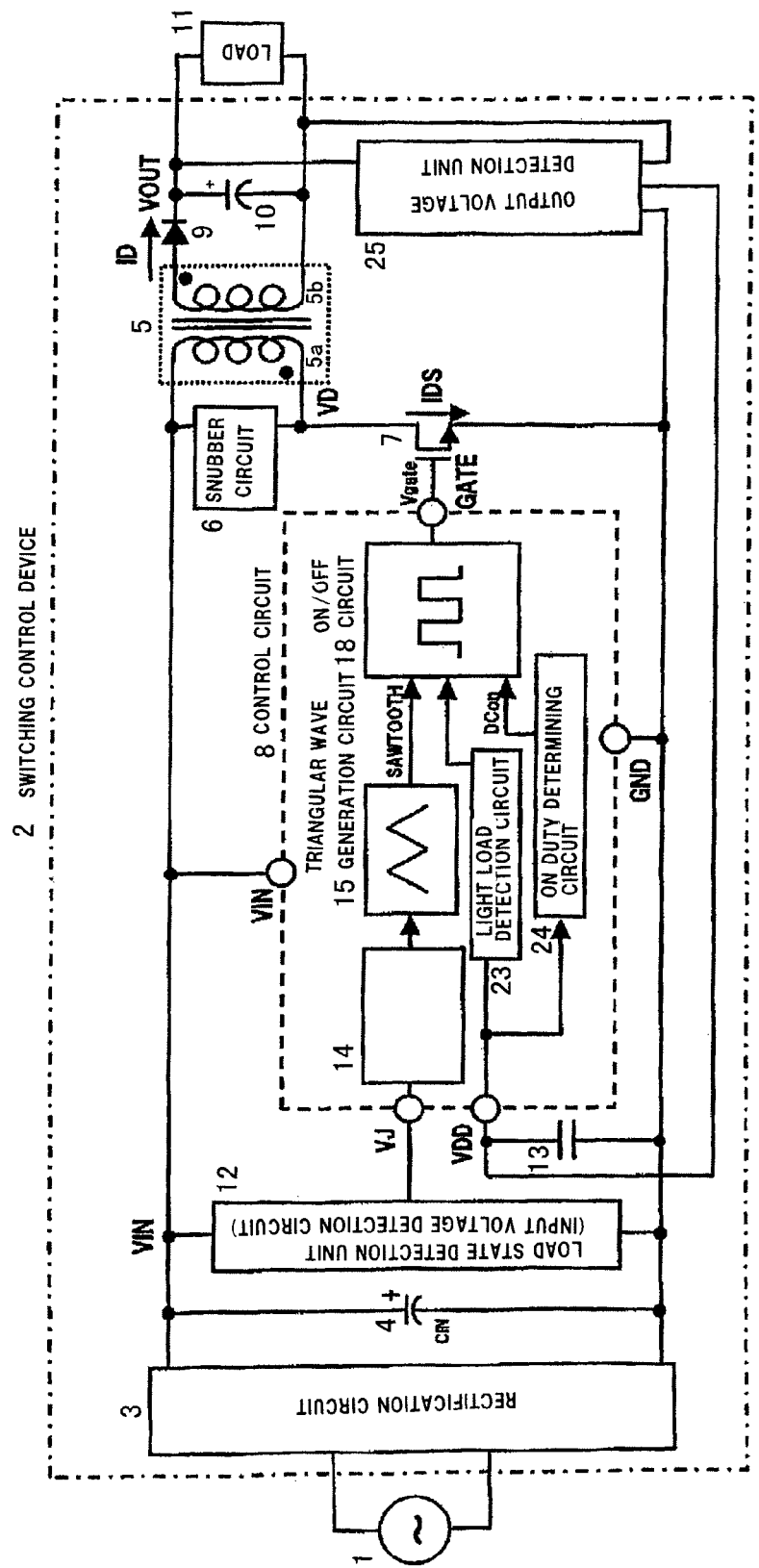
FIG. 14 is a circuit diagram showing a switching control device according to a ninth embodiment of the present invention.

FIG. 14 shows a switching control device according to a ninth embodiment of the present invention. Since this embodiment is the same as the switching control device according to the sixth embodiment of the present invention except in that the control circuit 8 is connected to the VDD terminal and a light load detection circuit 23 is provided which suspends or stops ON/OFF control over the switching element 7 by the ON/OFF circuit 18 in the case of no load or light load, only the effects by the light load detection circuit 23 will be explained below.

When the VDD terminal voltage which reflects the load state of the output reaches or exceeds an internally defined voltage, the light load detection circuit 23 detects that the output load is in a no load state or light load state and suspends or stops ON/OFF control over the switching element 7 by the ON/OFF circuit 18.

This can reduce power consumption in the case of no load or light load.

Here, providing the voltage defined in the light load detection circuit 23 with a hysteresis characteristic can stably control suspension or stoppage of ON/OFF control of the switching element.

Embodiment 10

Figure 15:
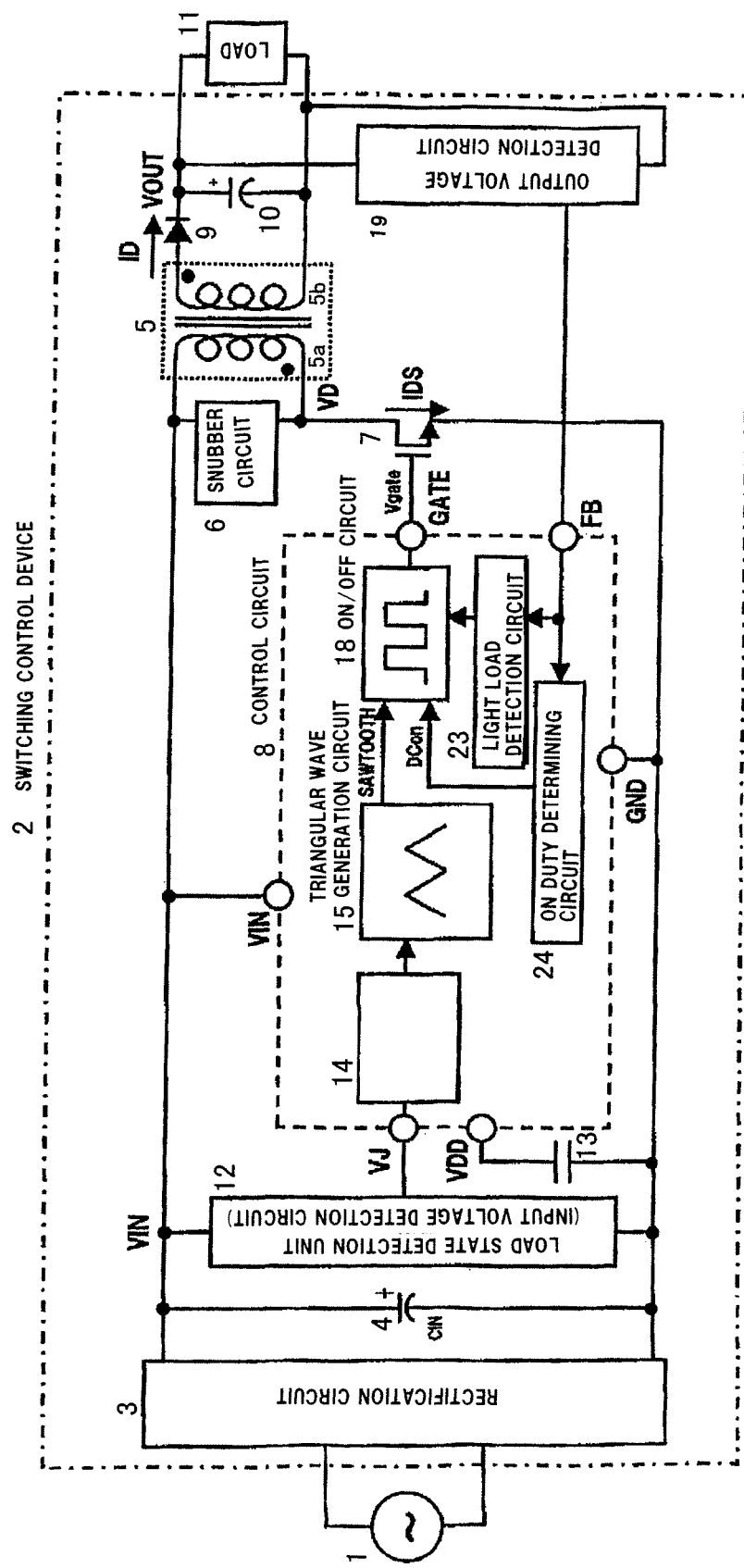
FIG. 15 is a circuit diagram showing a switching control device according to a tenth embodiment of the present invention.

FIG. 15 shows a switching control device according to a tenth embodiment of the present invention and the control circuit 8 is provided with an FB terminal for inputting the output of the output voltage detection circuit 19 in addition to the VDD terminal. Here, the circuit connected to the VDD terminal of the control circuit 8 in the switching control device according to the ninth embodiment of the present invention shown in FIG. 14 is connected to the FB terminal in the switching control device according to the tenth embodiment of the present invention in FIG. 15, the VDD terminal is supplied with power from the VIN terminal and is always controlled to a constant level as the supply voltage terminal of the control circuit 8. Therefore, switching control of the switching element 7 over the output signal of the output voltage detection circuit 19, on duty control and the effects obtained are the same as those of the switching control device according to the ninth embodiment shown in FIG. 14, and therefore explanations thereof will be omitted.

Embodiment 11

Figure 16:
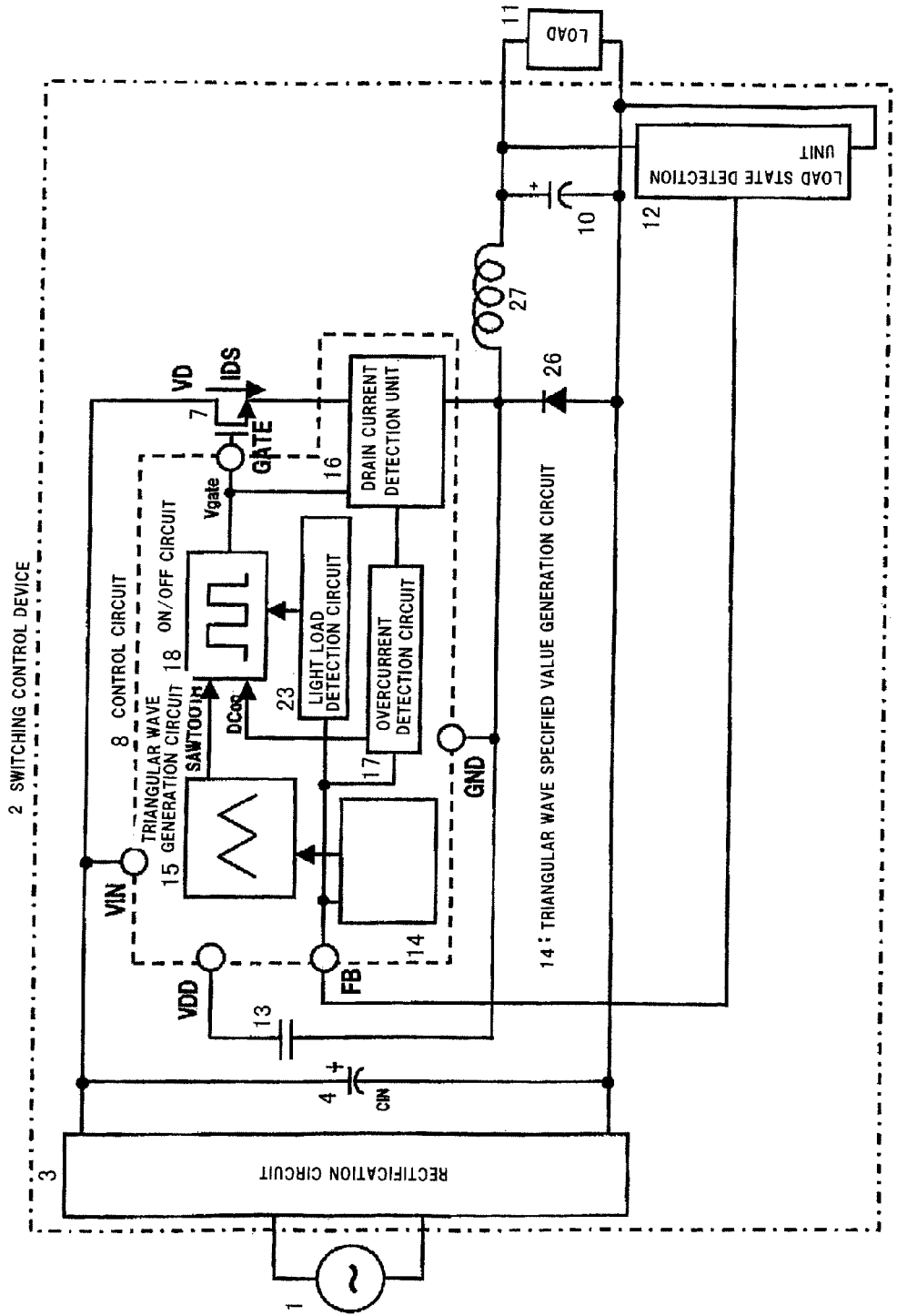
FIG. 16 is a circuit diagram showing a switching control device according to an eleventh embodiment of the present invention.

FIG. 16 shows a switching control device according to an eleventh embodiment of the present invention. The switching control device 2 shown in FIG. 16 is of a voltage drop chopper type wherein the voltage polarity of the output is plus (+) and is constructed of a rectification circuit 3 for rectifying a power supply 1 connected to the input, a smoothing capacitor 4 for smoothing the output of the rectification circuit 3, a switching element 7, a control circuit 8 that performs ON/OFF control over the switching element 7, a regenerative diode 26, a coil 27, a smoothing capacitor 10, a load state detection unit 12 that detects an output voltage to control the output voltage of the load 11 to a desired voltage and feeds back the detection result to an FB terminal of the control circuit 8 and a capacitor 13 connected to a VDD terminal of the control circuit 8 and a GND terminal. Power is supplied to the VDD terminal of the control circuit 8 from a VIN terminal at a startup and during operation and the VDD terminal is always controlled to a constant level as the supply voltage terminal of the control circuit 8. Here, the rectification circuit 3 is provided because the power supply 1 connected to the input is assumed to be an AC power supply, but when the power supply 1 is assumed to be a DC power supply, this rectification circuit 3 is not necessary. The control circuit 8 for controlling ON/OFF of the switching element 7 has the same configuration as that of the control circuit 8 shown in the switching control device according to the fifth embodiment in FIG. 8 and the ON/OFF control operation of the switching element 7 by the signal inputted to the FB terminal is also the same, and therefore explanations of the effects obtained will be omitted and only the operation as the switching control device will be explained.

A power supply to the load 11 connected to the output of the switching control device 2 in FIG. 16 is realized by supplying power from the switching element 7 to the smoothing capacitor 10 through the coil 27 when the switching element 7 is ON and is realized by supplying power of a counter electromotive force of the coil 27 to the smoothing capacitor 10 via a loop of the regenerative diode 26, coil 27 and smoothing capacitor 10 when the switching element 7 is OFF. When the voltage at both ends of the smoothing capacitor 10 reaches a desired voltage, the output signal of the load state detection unit 12 is transmitted to the FB terminal of the control circuit 8 to adjust the power supply to the output so that the output voltage reaches a desired voltage.

Embodiment 12

Figure 17:
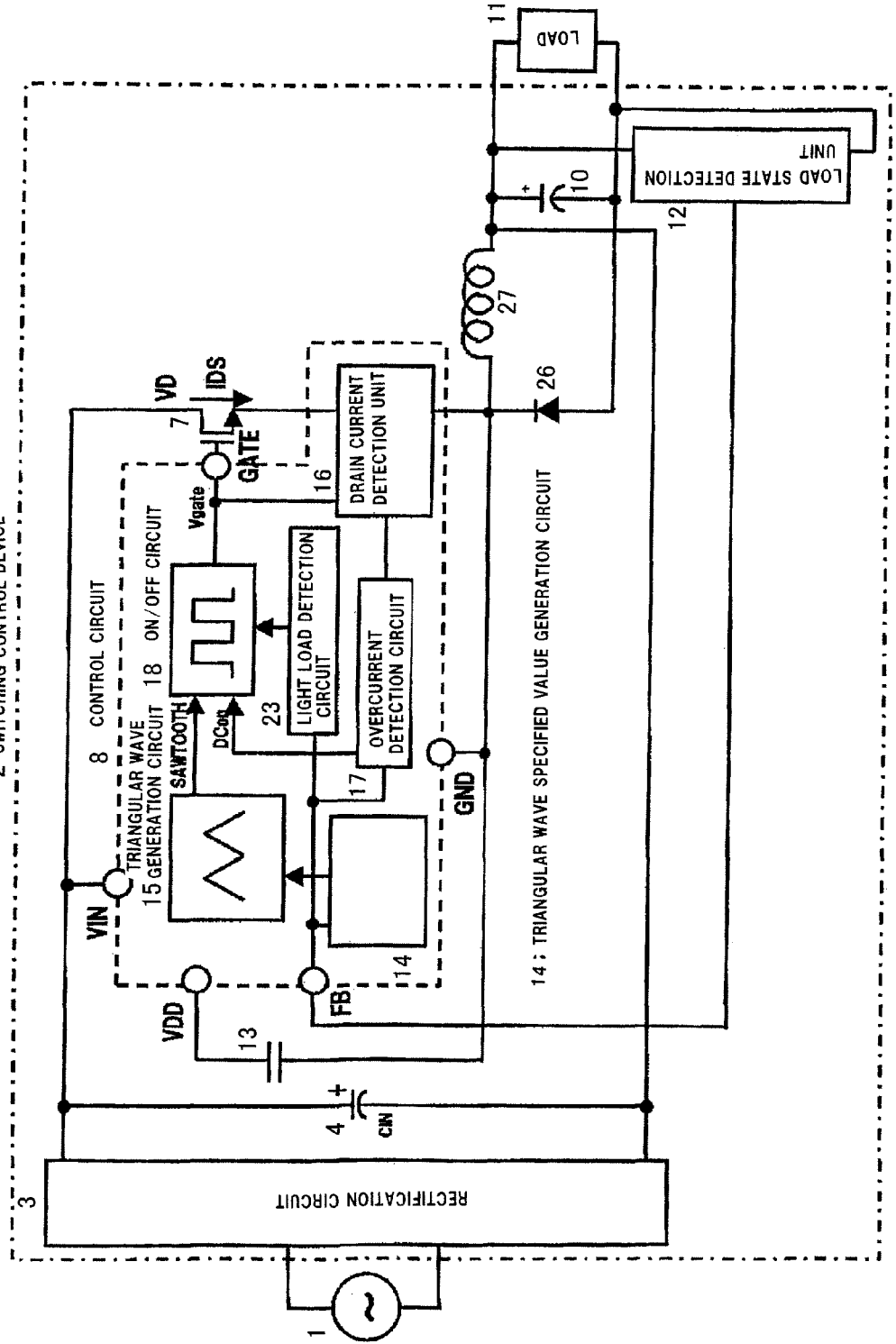
FIG. 17 is a circuit diagram showing a switching control device according to a twelfth embodiment of the present invention.
Figure 18:
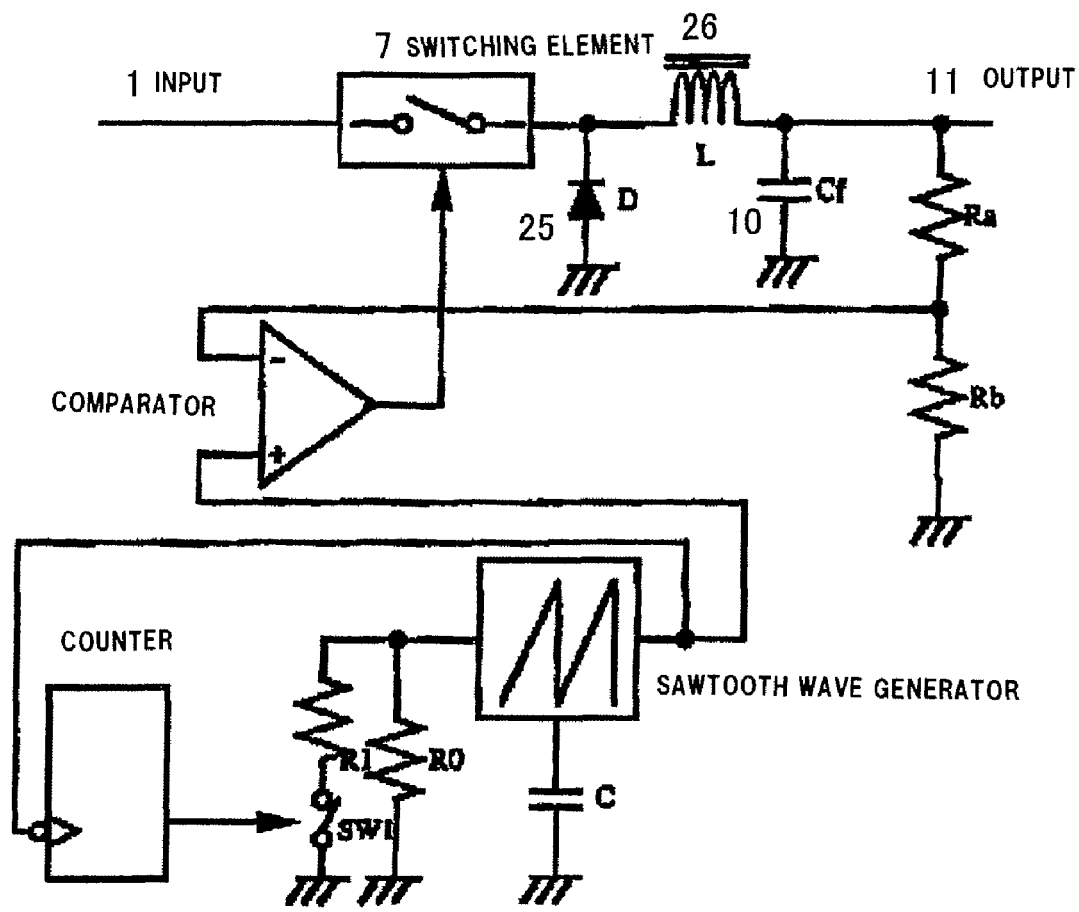
FIG. 18 is a circuit diagram showing a switching control device according to a first conventional example.

FIG. 17 shows a switching control device according to a twelfth embodiment of the present invention. While the minus (−) terminal of the smoothing capacitor 4 in the switching control device according to the eleventh embodiment of the present invention in FIG. 16 is connected to the minus (−) terminal of the smoothing capacitor 10, this twelfth embodiment is of a voltage drop chopper type that the voltage polarity of the output can be set to be minus (−) by connecting the minus (−) terminal of the smoothing capacitor 4 to the plus (+) terminal of the smoothing capacitor 10. The operation as the switching control device and the effects obtained are the same as those of the switching control device according to the eleventh embodiment of the present invention, and therefore explanations thereof will be omitted.

The present invention is applicable to a switching element and a switching control device having a control circuit that controls the switching element in general, and is particularly useful for a control device having a power transistor such as a switching power supply that controls the power transistor.

What is claimed is:

1. A switching control device for supplying power to a load connected to an output, comprising:
   a switching element;
   a load state detection unit for detecting a state of a load connected to the output; and
   a control circuit for controlling ON/OFF of the switching element,
   wherein the control circuit comprises a triangular wave generation circuit and a triangular wave specified value generation circuit, wherein the triangular wave specified value generation circuit is for generating an upper limit or a lower limit of a triangular wave from the triangular wave generation circuit, wherein the upper or lower limit increases or decreases according to the state of the load detected by the load state detection unit, so that a frequency of an output signal or an input signal of the switching element is dispersed, or a jitter occurs in a frequency of an output signal or an input signal of the switching element.

2. The switching control device according to claim 1, wherein the load state detection unit comprises an input voltage detection circuit.

3. The switching control device according to claim 1, wherein the control circuit comprises an overcurrent detection circuit for adjusting a current flowing into the switching element according to the state of the load detected by the load state detection unit.

4. The switching control device according to claim 1, wherein the upper limit is generated by the triangular wave specified value generation circuit.

5. The switching control device according to claim 1, wherein the lower limit is generated by the triangular wave specified value generation.

6. The switching control device according to claim 1, wherein the control circuit comprises a light load detection circuit for suspending or stopping ON/OFF control of the switching element when the state of the load is no load or light load.

7. The switching control device according to claim 6, wherein the load state detection unit comprises an input voltage detection circuit.

8. The switching control device according to claim 6, wherein the control circuit comprises an overcurrent detection circuit for adjusting a current that flows into the switching element according to the state of the load detected by the load state detection unit.

9. The switching control device according to claim 6, wherein the upper limit is generated by the triangular wave specified value generation circuit.

10. The switching control device according to claim 6, wherein the lower limit is generated by the triangular wave specified value generation circuit.

11. The switching control device according to claim 1, wherein as an output voltage of the load state detection unit decreases, an oscillating frequency of the switching element increases.

12. The switching control device according to claim 1, wherein as an output voltage of the load state detection unit decreases, a frequency of triangular waves of the triangular wave generation circuit increases.

13. The switching control device according to claim 4, wherein as an output voltage of the load state detection unit decreases, the upper limit falls.

14. The switching control device according to claim 1, wherein as an output voltage of the load state detection unit increases, an oscillating frequency of the switching element decreases.

15. The switching control device according to claim 1, wherein as an output voltage of the load state detection unit increases, a frequency of triangular waves of the triangular wave generation circuit decreases.

16. The switching control device according to claim 4, wherein as an output voltage of the load state detection unit increases, the upper limit rises.

17. The switching control device according to claim 1, wherein the input signal of the switching element is a gate drive signal.

18. A semiconductor device comprising a single package in which at least a switching element and a control circuit of the switching control device according to claim 1 are integrated.

* * * * *